United States Patent [19]

Kinoshita

[11] Patent Number: 5,574,899
[45] Date of Patent: Nov. 12, 1996

[54] GENERATION NUMBER MANAGING APPARATUS FOR ADJUSTING GENERATION NUMBERS AMONG PROCESSORS OR PROGRAM FILES

[75] Inventor: Hideo Kinoshita, Kawasaki, Japan

[73] Assignee: Fujitsu Limited, Kanagawa, Japan

[21] Appl. No.: 190,326

[22] Filed: Jan. 31, 1994

[30] Foreign Application Priority Data

Sep. 16, 1993 [JP] Japan ................................ 5-229991

[51] Int. Cl.⁶ .................................................. G06F 17/30
[52] U.S. Cl. ................... 395/601; 364/283.4; 364/282.1; 364/228.1; 364/DIG. 1
[58] Field of Search ..................................... 395/800, 600; 396/800, 600

[56] References Cited

U.S. PATENT DOCUMENTS 4,558,413  12/1985  Schmidt ................................. 395/600
5,043,871  8/1991  Nishigaki ............................... 395/600
5,493,671  2/1996  Pitt ........................................ 395/500

Primary Examiner—Eric Coleman

[57] ABSTRACT

A generation number managing apparatus for adjusting generation numbers among processors or program files in a multiprocessor system, includes: a generation number controlling unit for receiving update data regarding the generation numbers of the processors or program files; and a generation number managing unit operatively connected to the generation number controlling unit for holding the generation numbers of the processors or program files. Compatibility of the generation numbers is determined by comparing them among processors or program files, and updating the generation numbers when they are compatible thereamong.

7 Claims, 9 Drawing Sheets

Fig.3A
|  | (ANOTHER) | | |
|---|---|---|---|
| (UNIT'S OWN) | CPU1 | CPU2 | CPU3 |
| CPU1 | (1,1) | (1,2) | (1,3) |
| CPU2 | (2,1) | (2,2) | (2,3) |
| CPU3 | (3,1) | (3,2) | (3,3) |
~22 CURRENT TABLE
Fig.3B
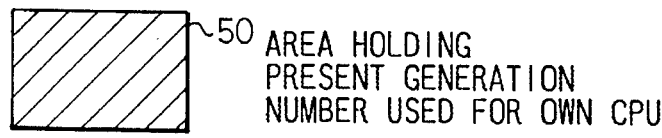
Fig.3C
Fig.3D
|  | (ANOTHER) | | |
|---|---|---|---|
| (UNIT'S OWN) | CPU1 | CPU2 | CPU3 |
| CPU1 | V2 | V1 | V3 |
| CPU2 | V1 | V2 | — |
| CPU3 | V1 | — | V1 |
~22 CURRENT TABLE Fig.4A (BEFORE UPDATE)
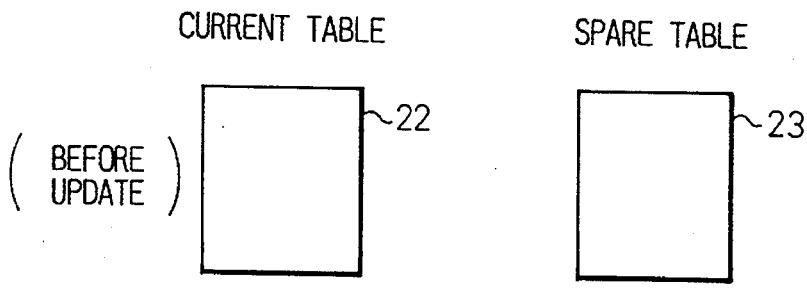
Fig.4B (UPDATE)
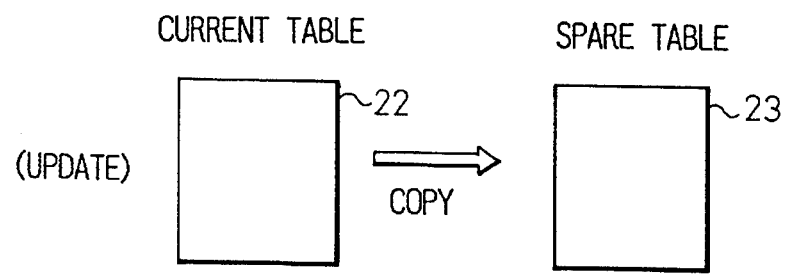
Fig.4C (UPDATE)
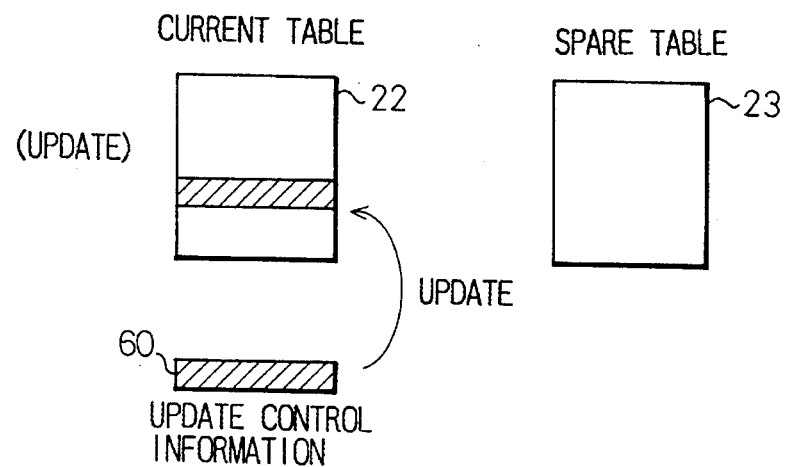
Fig.4D (ABNORMAL STATE)
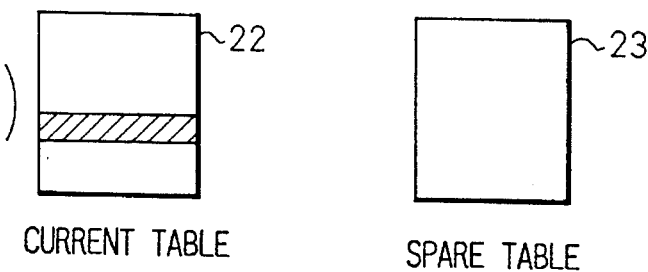

| (CPU"1") V/R=1/2 | V/R=1/1 | V/R=1/8 |
|---|---|---|
| V/R=1/1 | (CPU"2") V/R=1/3 | — |
| V/R=1/2 | — | (CPU"3") V/R=1/8 |

90 (GENERATION NUMBER MANAGING TABLE)

| (CI) OWN CPU -ID=CPU"2" | (CPU"1") V/R=1/1 | (CPU"2") V/R=1/3 | (CPU"3") — |
|---|---|---|---|

96 (UPDATE DATA)

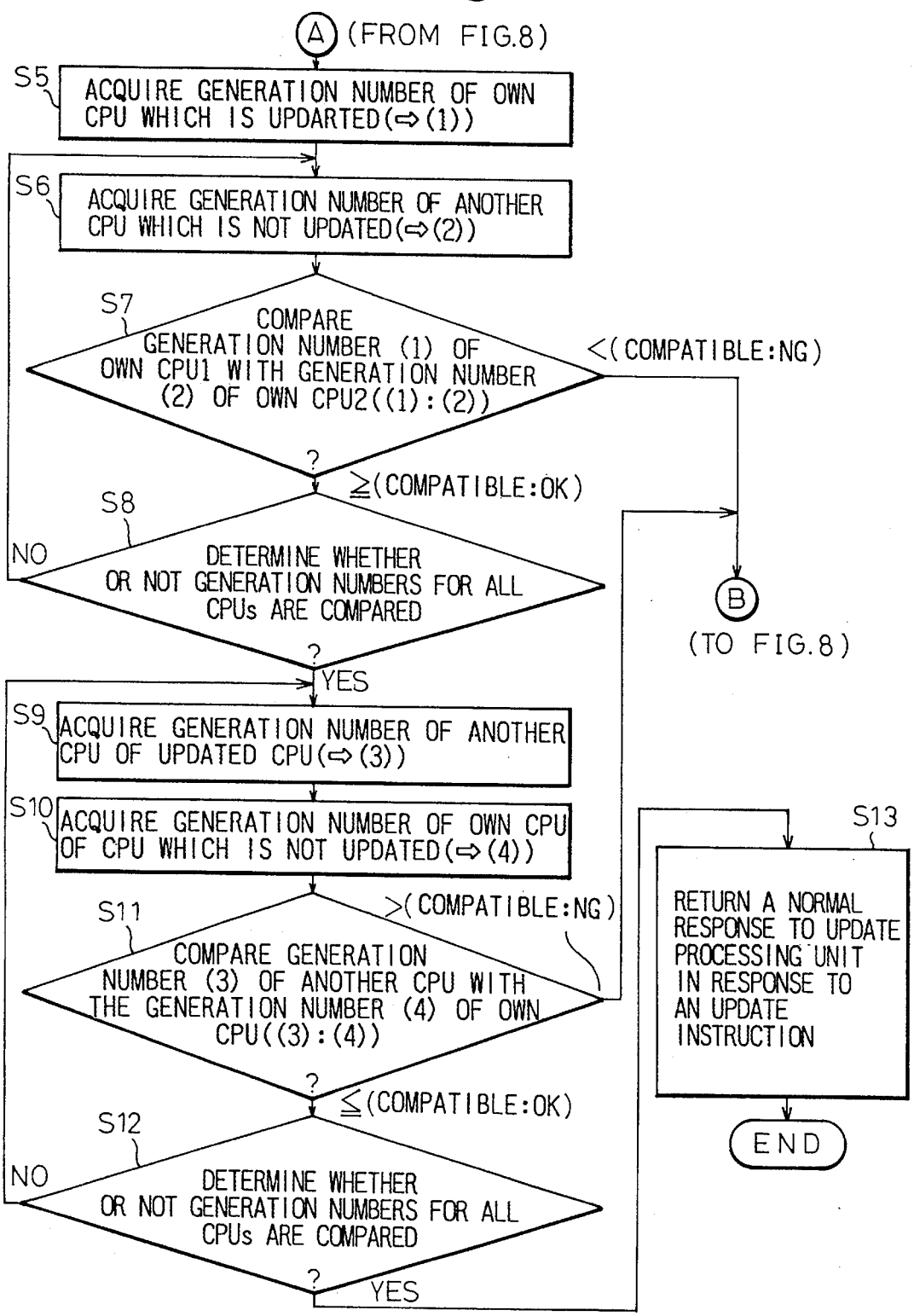

GENERATION NUMBER MANAGING APPARATUS FOR ADJUSTING GENERATION NUMBERS AMONG PROCESSORS OR PROGRAM FILES

BACKGROUND OF THE INVENTION

1. Field of the Invention

The present invention relates to a generation number managing apparatus for adjusting generation numbers among processors or program files. The present invention is advantageously used in a multiprocessor system which is formed of a plurality of processors.

2. Description of the Related Art

In general, a multiprocessor system is formed by a plurality of processors, and each processor includes at least a central processing unit (CPU) and a program file. When either one of the processors or a program file is changed to another one, a generation number (for example, a version number) thereof also is revised. In this case, a user must quickly check compatibility of generation numbers among processors or program files before use of the multiprocessor system.

SUMMARY OF THE INVENTION

The object of the present invention is to provide a generation number managing apparatus in which a user can quickly check the compatibility of generation numbers among processors or program files before use of the multiprocessor system.

In accordance with the present invention, there is provided a generation number managing apparatus for adjusting generation numbers among processors or program files in a multiprocessor system. The apparatus includes: a generation number controlling unit for receiving update data regarding the generation numbers of the processors or program files; and a generation number managing unit operatively connected to the generation number controlling unit for holding the generation numbers of the processors or program files, determining compatibility of the generation numbers by comparing them among processors or program files, and updating the generation numbers when they are compatible thereamong.

In one preferred embodiment, the generation number managing unit comprises: a first table for holding present generation numbers (below, current table); a second table for holding generation numbers from one generation before (below, spare table); an update processing unit for updating the generation numbers which are held in the current table based on the update data; a generation number compatibility decision unit for determining compatibility of the generation numbers which are held in the current and spare tables; and a switch unit for changing over the current table to the spare table when the generation numbers are not compatible.

In another preferred embodiment, the update processing unit comprises a copy processing unit for copying the contents of the current table to the spare table, and a processing unit for updating the contents of the current table.

In still another preferred embodiment, the generation number compatibility decision unit comprises a generation number acquiring unit for acquiring the generation numbers from the current table, and a generation number comparing unit for comparing the generation numbers which are acquired from the current table among processors or program files.

In still another preferred embodiment, the switch unit comprises a result acquiring unit for acquiring the result of comparison in the generation number comparing unit, and a switch processing unit for changing the current table to the spare table based on the result of comparison.

In still another preferred embodiment, the generation number includes a version number and a revision number which indicates a class in the same version.

In still another preferred embodiment, the generation number managing apparatus further comprises an update data input unit for sending the update data to the generation number control means.

In still another preferred embodiment, the generation number managing apparatus further comprises an output unit for outputting a generation number managing information.

BRIEF DESCRIPTION OF THE DRAWINGS

In the drawings:

FIGS. 3A, 3B, 3C, 3D are explanatory views of a current table according to the present invention;

FIGS. 4A, 4B, 4C, 4D are explanatory views of the basic operation of the present invention;

FIGS. 8 and 9 are flowcharts of the operation of the present invention.

DESCRIPTION OF THE PREFERRED EMBODIMENTS

Before describing preferred embodiments of the present invention, a conventional art and its problem will be explained briefly hereinafter.

Figure 1:
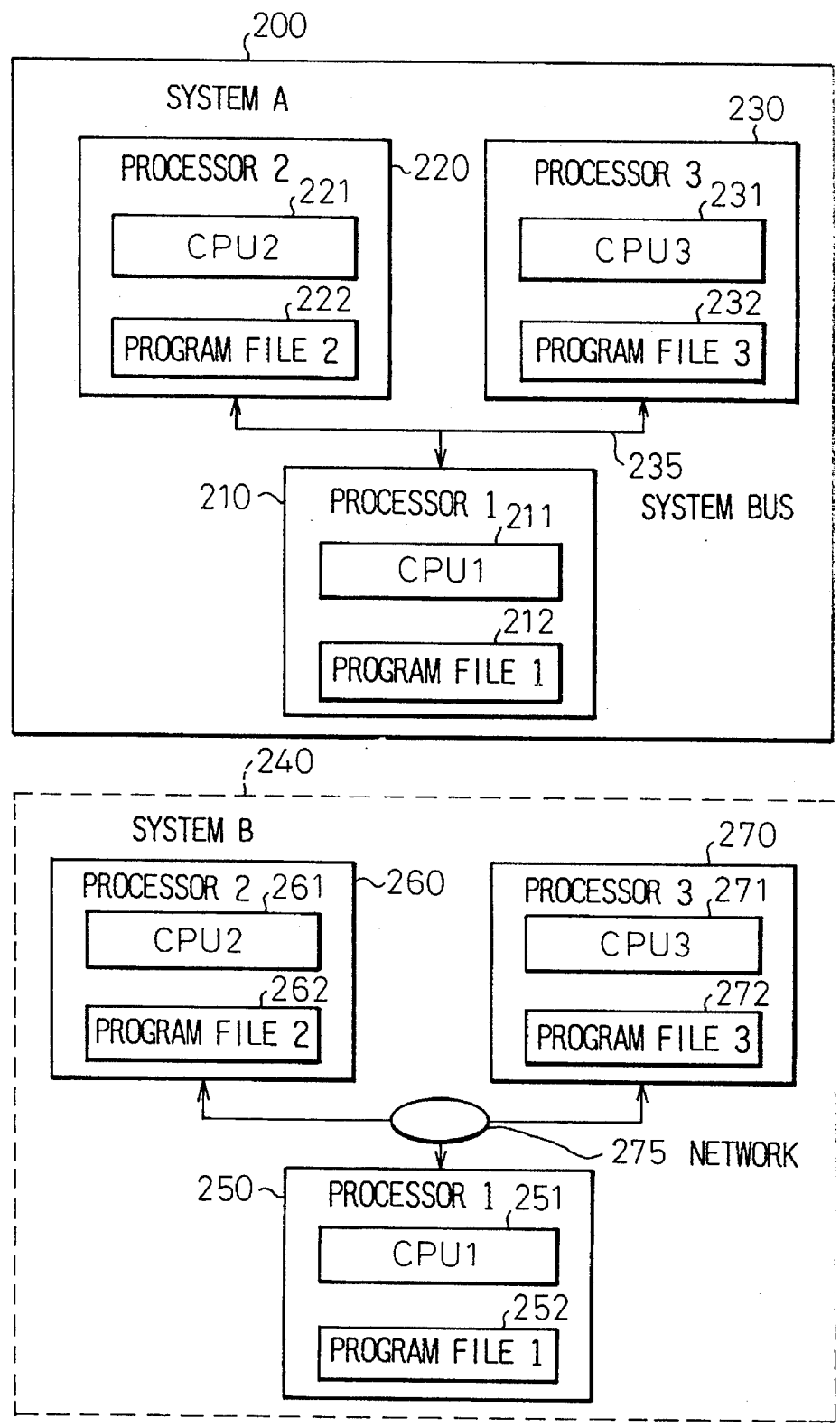
FIG. 1 is an explanatory view of a conventional generation managing apparatus.

FIG. 1 is an explanatory view of a conventional generation managing apparatus. As shown by the drawing, in this example, a multiprocessor system A (200) is formed by three processors, i.e., a processor 210, a processor 220, and a processor 230. These processors 210 to 230 are connected to each other by a transmission line, for example, a system bus.

Similarly, a multiprocessor system B (240) is formed by three processors, i.e., a processor 250, a processor 260, and a processor 270. In the system B, these processors 250 to 270 are connected to each other by a network. In this drawing, a memory is omitted to simplify the explanation.

Further, each processor includes at least a central processing unit CPU and a program file for the CPU. That is, in the system A, the processor 1 (210) includes the CPU 1 (211) and the program file 1 (212), the processor 2 (220) includes the CPU 2 (221) and the program file 2 (222), and the processor 3 (230) includes the CPU 3 (231) and the program file 3 (232). Similarly, in the system B, the processor 1 (250) includes the CPU 1 (251) and the program file 1 (252), the processor 2 (260) includes the CPU 2 (261) and the program file 2 (262), and the processor 3 (270) includes the CPU 3 (271) and the program file 3 (272).

For example, when the generation number, for example, the version number of the program file 1 (212) is revised, it is necessary to adjust the version numbers of program files 2 (222) and 3 (232) in accordance with that of the program file 1 (or a previous version number which can be adjusted to the program file 1).

If the generation numbers are not compatible between (or among) program files, the system does not operate normally so that the user can not use the system. Accordingly, it is necessary to quickly adjust the generation numbers, for example, the version numbers among processors in order to enable the system to operate.

Conventionally, the user checks the generation numbers manually one by one by accessing each of processors or program files in order to confirm whether each generation number is correct before use of the system.

However, once the system breaks down, it is very troublesome to find the cause of failure. That is, whether the failure is caused by hardware, or a generation number. As a result, a lot of time is required to locate the trouble.

The object of the present invention is to provide a generation number managing apparatus for automatically adjusting generation numbers of CPUs or program files among processors or program files.

Briefly, in the present invention, a generation number managing table is provided for managing generation numbers, for example, version numbers, and revision numbers which indicate a level at the same version number, for each processor and program file. As explained in detail below, two kinds of generation number managing tables, i.e., a current table and a spare table, are provided, and these tables are updated for every change of the generation number. Further, in the present invention, the generation number is compared between (or among) processors or program files to determine compatibility therebetween.

Figure 2:
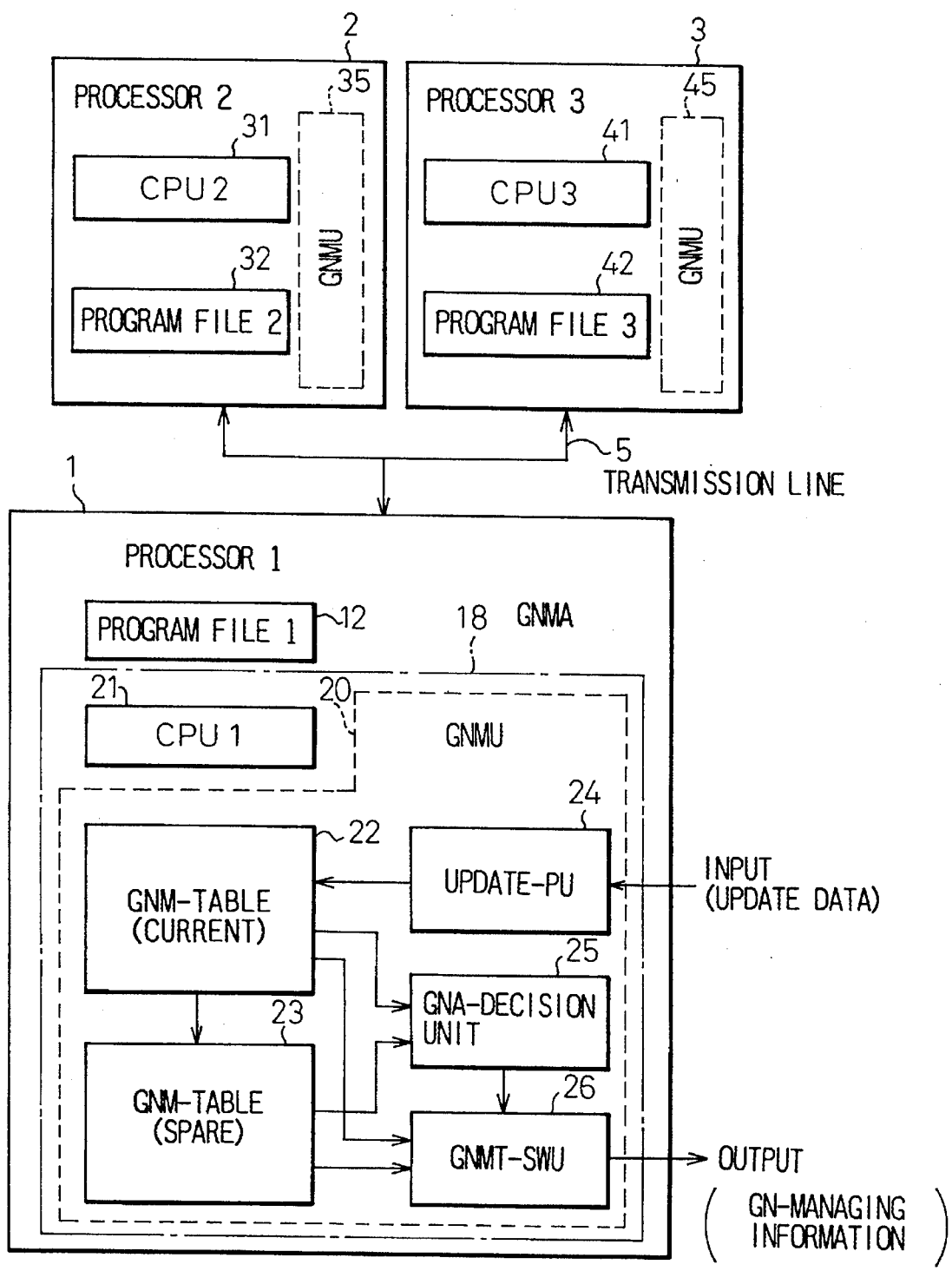
FIG. 2 is a basic structure of a generation number managing apparatus according to the present invention.

FIG. 2 is a basic structure of a generation number managing apparatus according to the present invention. As shown by the drawing, for example, a multiprocessor system is formed by three processors 1 to 3, i.e., a processor 1, a processor 2, and a processor 3. These processors 1 to 3 are connected to each other by a system bus used as a transmission line.

Further, each processor includes at least the central processing unit CPU and the program file used for the CPU. That is, for example, the processor 1 includes the CPU 1 (21) and the program file 1 (12), the processor 2 includes the CPU 2 (31) and the program file 2 (32), and the processor 3 includes the CPU 3 (41) and the program file 3 (42).

Still further, each processor includes a generation number managing unit (GNMU) according to the present invention. The generation number managing apparatus (GNMA) according to the present invention further includes the CPU in each processor. That is, the processor 1 further includes a generation number managing unit (GNMU) 20, the processor 2 includes a generation number managing unit (GNMU) 35, and the processor 3 includes a generation number managing unit (GNMU) 45. For example, in the processor 1, the generation number managing apparatus (GNMA) 18 is formed by the CPU 1 (21) and the generation number managing unit (GNMU) 20.

Further, the generation number managing unit (GNMU) 20 includes a generation number managing table (GNM-TABLE(CURRENT)) 22 which is used for a current apparatus, a generation number managing table (GNM-TABLE(SPARE)) 23 which is used for a spare apparatus, an update processing unit (UPDATE-PU) 24, a generation number compatibility decision unit (GNA-DECISION UNIT) 25, and a generation number managing table switch unit (GNMT-SWU) 26 for changing over between the current table 22 and the spare table 23.

The generation number managing table (GNM-TABLE-(CURRENT)) 22 for the current apparatus (below, current table) holds the latest generation numbers in each of processors 1 to 3.

The generation number managing table (GNM-TABLE(SPARE)) 23 for the spare apparatus (below, spare table) holds generation numbers from one previous generation regarding each of processors 1 to 3.

The update processing unit (UPDATE-PU) 24 updates the current table 22 when the generation number of the processor or the program file is revised.

The generation number compatibility decision unit (GNA-DECISION UNIT) 25 determines whether the compatibility of generation numbers among processors/program files is achieved after the generation numbers are updated.

The generation number managing table switch unit (GNMT-SWU) 26 changes over the generation number managing table between the current table 22 and the spare table 23. When the multiprocessor system operates normally, the current table 22 is used for the generation number managing apparatus. When the multiprocessor system does not operate normally after update of the generation numbers, the spare table 23, which holds generation numbers just one generation earlier, is used for the generation number managing apparatus.

FIGS. 3A to 3D are explanatory views of the current table according to the present invention. In FIG. 3A, reference number 22 denotes the current table. This example shows the table used for the multiprocessor system which is formed by three processors CPU 1, CPU 2 and CPU 3.

Further, a column direction in a matrix corresponds to a unit's own processor, and a row direction in the matrix corresponds to another processor. Each box indicates a matrix element, and each matrix element is shown by (row number, column number).

For example, the first row indicates the matrix elements for the unit's own CPU 1. For example, "(1,1)" indicates the area holding the present generation number used for the unit's own CPU 1, and "(1,2)" indicates the area holding the connectable generation number in which the unit's own CPU 1 can connect to another CPU 2. Similarly, "(1,3)" indicates the area holding the connectable generation number in which the unit's own CPU 1 can connect to another CPU 3.

Similarly, the second row indicates the matrix elements for another unit's own CPU 2. For example, "(2,1)" indicates the area holding the connectable generation number in which the CPU 2 can connect to another CPU 1, "(2,2)" indicates the area holding the present generation number used for the CPU 2, and "(2,3)" indicates the area holding the connectable generation number in which the CPU 2 can connect to another CPU 3.

Similarly, the third row indicates the matrix elements for another unit's own CPU 3. For example, "(3,1)" indicates the area holding the connectable generation number in which the CPU 3 can connect to another CPU 1, "(3,2)" indicates the area holding the connectable generation number in which the CPU 3 can connect to another CPU 2, and "(3,3)" indicates the area holding the present generation number used for the CPU 3.

In FIG. 3B, reference number 50 corresponds to each hatched area of FIG. 3A. As explained in FIG. 3A, this indicates the area which holds the present generation number used for each unit's own CPU in each row.

In FIG. 3C, reference number 51 corresponds to each white area of FIG. 3A. As explained in FIG. 3C, this indicates the area which holds the connectable generation number in which a unit's own CPU can connect to another CPU.

In FIG. 3D, V1 to V3 indicate generation numbers, for example, version numbers. For example, in the first row, the version number V2 at the matrix element (1,1) indicates that the present version number of the CPU 1 is V2. Further, the version number V1 at the matrix element (1,2) indicates that the CPU 1 can connect to another CPU 2 by using the version number V1 or a version number larger than V1. Similarly, the version number V3 at the matrix element (1,3) indicates that the CPU 1 can connect to another CPU 3 by using the version number V3 or a version number larger than V3.

Further, in the second row, the version number V1 at the matrix element (2,1) indicates that the CPU 2 can connect to another CPU 1 by using the version number V1 or a version number larger than V1. Further, the version number V2 at the matrix (2,2) indicates that the present version number of the CPU 2 is V2.

Still further, in the second row, a symbol "—" at the matrix (2,3) indicates that the CPU 2 can operate with another CPU 3 regardless of the version number.

Further, in the third row, the version number V1 at the matrix element (3,1) indicates that the CPU 3 can connect to another CPU 1 by using the version number V1 or a version number larger than V1. Further, the version number V1 at the matrix (3,3) indicates that the present version number of the CPU 3 is V1.

Still further, in the third row, the symbol "—" at the matrix (3,2) indicates that the CPU 3 can operate with another CPU 2 regardless of the version number.

In the above case, as an example of the symbol "—", a value which is smaller than the minimum version number, for example, "00" or "−1", is usually used, and these values are stored in the area of the symbol "—".

FIGS. 4A to 4D are explanatory views of the basic operation of the present invention. In these drawings, reference number 22 indicates the current table, and 23 indicates the spare table. Further, reference number 60 indicates update data which is used as update control information.

In FIG. 4A, this drawing shows the state of the table before being updated. The present current table 22 is used in the state before being updated. The current table 22 holds all generation numbers of the processors 1 to 3. Further, the spare table 23 holds generation numbers from one previous generation.

In FIGS. 4B and 4C, these drawings show the update state. For example, in the processor 1, it is assumed that the generation number of the CPU 1 or the version number of the program file 1 is revised to a new number. First, the update processing unit (UPDATE-PU) 24 (see, FIG. 2) copies the contents of the current table 22 into the spare table 23. Next, the update processing unit 24 writes the update data 60 (i.e., update control information) into the current table 22 (a hatched area of the table 22) by designating an address of the hatched area.

In FIG. 4D, the generation number compatibility decision unit (GNA-DECISION UNIT) 25 (see, FIG. 2) determines whether each of the processors 1 to 3 can operate normally based on generation numbers of the CPUs and program files which are held in the current table 22.

In the decision unit 25, the decision of the compatibility is performed based on comparison of the generation numbers in the current table 22. For example, 10 it is assumed that the first row of the CPU 1 is updated (see, FIG. 3D). That is, the second and third rows are not updated. In this case, the decision unit 25 compares the version number V2 (matrix element (1,1)) of the unit's own CPU 1 with the version number V1 (matrix element (2,1)) of another CPU 1 at the second row.

When the version number V2 (matrix element (1,1)) of the CPU 1 is larger than the version number V1 (matrix element (2,1)) of another CPU 1 at the second row, the decision unit 25 determines that the generation number is compatible.

On the contrary, when the version number V2 of the CPU 1 is smaller than the version number V1 of another CPU 1 at the second row, the decision unit 25 determines that the generation number is not compatible.

Further, the decision unit 25 compares the present version number V2 (matrix element (1,1)) of the CPU 1 with the version number V1 (matrix element (3,1)) of another CPU 1 at the third row, and performs the operations as mentioned above to determine the compatibility of the generation numbers.

Next, the decision unit 25 compares the version number V1 (matrix element (1,2)) of another CPU 2 (the first row is updated as mentioned above) with the version number V2 (matrix element V2 (2,2)) of the unit's own CPU 2 (the second row is not updated as mentioned above). When the former is larger than the latter, the decision unit 25 determines that the generation number is compatible. When the former is smaller than the latter, the decision unit 25 determines that the generation number is not compatible.

Still further, the decision unit 25 compares the version number V3 (matrix element (1,3)) of another CPU 3 with the version number V1 (matrix element (3,3)) of the unit's own CPU 3. When the former is larger than the latter, the decision unit 25 determines that the generation number is compatible. When the former is smaller than the latter, the decision unit 25 determines that the generation number is not compatible.

As a result of the above processes, when the decision unit 25 determines that the updated current table 22 is used as the current table. On the contrary, when the decision unit 25 determines that the updated generation number managing table 22 cannot be adjusted for one of the processors, the generation number managing table 22 can be adjusted among processors, the generation number managing table 22 is not used as the current table. In this case, the decision unit 25 outputs the information that the updated version is not compatible for one of the processors. At that time, the switch unit 26 changes over the table from the current table 22 to the spare table 23.

Figure 5:
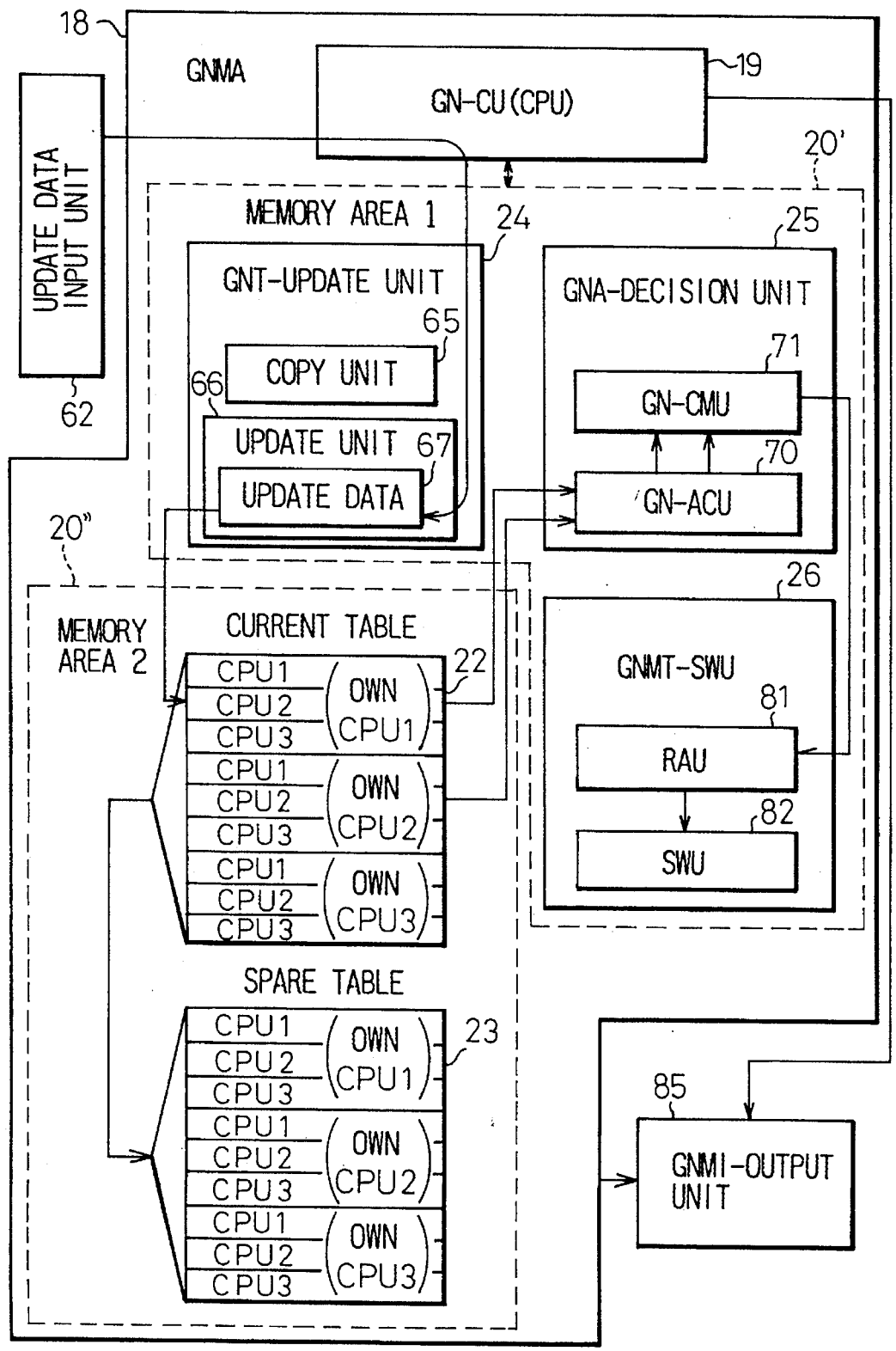
FIG. 5 is a detailed block diagram of a generation number managing apparatus according to an embodiment of the present invention.

FIG. 5 is a detailed block diagram of a generation number managing apparatus according to an embodiment of the present invention. In FIG. 5, reference number 18 denotes the generation number managing apparatus (GNMA) according to the present invention.

The generation number managing apparatus (GNMA) 18 includes a generation number controlling unit (GN-CU) 19, a first memory area 20', and a second memory area 20". Further, the generation number managing apparatus 18 is connected to an input unit 62 for the update data, and an output unit 85 for the generation number managing information (GNMI-OUTPUT UNIT).

Preferably, the generation number controlling unit 19 is formed by the CPU which corresponds to the CPU 1 (21) of FIG. 2. The first memory area 20' stores programs for the update processing unit 24 for the managing table (GNT-UPDATE UNIT), the generation number decision unit (GNA-DECISION UNIT) 25, and the switch unit 26 for switching the managing tables 22 and 23 (GNMT-SWU).

The second memory area 20" stores the current table 22 and the spare table 23.

In the update processing unit (GNT-UPDATE UNIT) 24, the input unit 62 inputs the update data (update control information) regarding the generation numbers to the update processing unit (UPDATE UNIT) 66 which updates the current table 22. In actuality, the input unit 62 automatically reads the version numbers which are written into the updated program, and inputs them into the update processing unit 66. Further, the input unit 62 may input the version numbers through a keyboard of the system.

Reference number 65 denotes a copy processing unit (COPY UNIT) provided for coping the contents of the current table 22 to the spare table 23. Reference number 67 denotes the update data (update control information).

In the generation number compatibility decision unit (GNA-DECISION UNIT) 25, reference number 70 denotes a generation number acquiring unit (GN-ACU) for acquiring the generation numbers in the current table 22. Reference number 71 denotes a generation number comparing unit (GN-CMU) for comparing the generation numbers in the current table 22.

In the switch unit (GNMT-SWU) 26 for switching between the current table 22 and the spare table 23, reference number 81 denotes a result acquiring unit (RAU) for storing the result of the generation number comparing unit 71. Reference number 82 denotes a switch processing unit (SWU) for selecting the current table 22 or the spare table 23 based on the result of comparison. Further, reference number 85 denotes a generation number output unit (GNMI-OUTPUT) for outputting the generation numbers selected in the current table 22 or the spare table 23.

The operation of FIG. 5 will be explained in detail with respect to FIGS. 8 and 9 hereinafter.

Figures 6A, 6B, 6C:
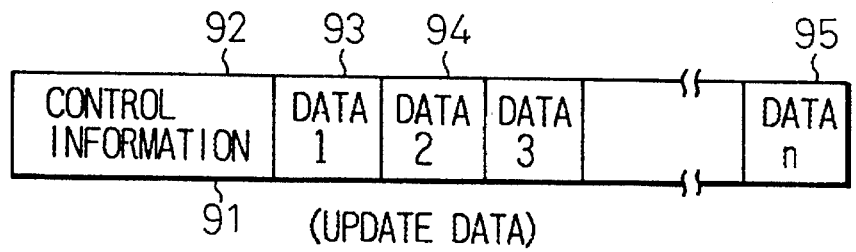
FIGS. 6A, 6B, 6C are explanatory views of a generation number managing table and an update control information according to an embodiment of the present invention.

FIGS. 6A to 6C are explanatory views of the generation number managing table and the update control information according to an embodiment of the present invention.

In FIG. 6A, reference number 90 denotes the generation number managing table. In this table, "V" denotes the version, and "R" denotes the revision which indicates a class in the same version. For example, "V/R=½" of the matrix element (1,1) means that the version V is "1" and the revision R is "2" for the present generation number of the CPU 1. As explained above, the symbol "—" means that the CPU 2 can operate with another CPU 3 regardless of the version number. In this case, the version and revision are set to the minimum value, for example, "V/R=0/0" or "V/R=–1/–1".

In FIG. 6B, reference number 91 denotes the update control information. The update control information indicates the update data for the CPU or the program file, and is formed by an identifier of the unit's own CPU and generation numbers (i.e., the unit's own generation number and the connectable generation number to another CPU).

In the update data 91, reference number 92 denotes control information (CI), for example, an identifier for the CPU to be updated. Reference numbers 93 to 95 denote a plurality of data D1, D2, D3, - - - , Dn. Each data corresponds to the generation number of the CPU. For example, the data D1 corresponds to the generation number of the CPU 1, and other areas store the generation numbers each of which corresponds to the connectable generation number with the CPU. When it is not necessary for the CPU to cooperate with another CPU, the version "00" or "31 1" is stored in the corresponding area.

In FIG. 6C, reference number 96 denotes one example of the update data. Reference number 97 denotes the area for the control information(CI), i.e., the identifier (ID) of the CPU 2. That is, the identifier of the CPU is CPU "2". Reference numbers 98 to 100 denote areas each of which stores the generation number of another CPU. That is, the area 98 stores the generation number of another CPU 1 which corresponds to "V/R=1/1". The area 99 stores the generation number of another CPU 2 which corresponds to "V/R=⅓". The area 100 stores the generation number of another CPU 3, and the cooperation with the a unit's own CPU is not necessary in this case.

Figure 7:
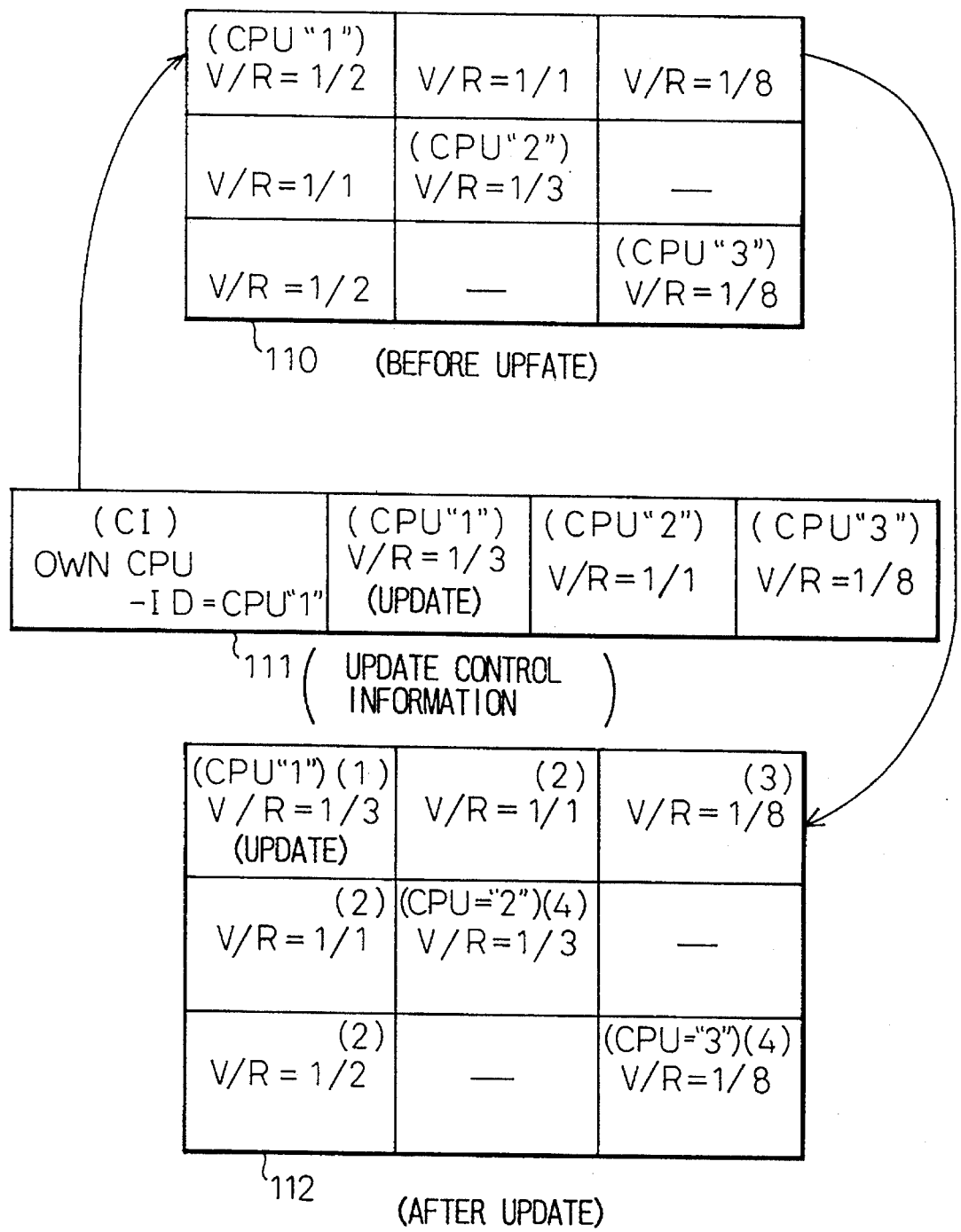
FIG. 7 is an explanatory view of the update process of the generation number managing table according to the present invention.

FIG. 7 is an explanatory view of the update process of the generation number managing table. In FIG. 7, reference number 110 denotes the generation number managing table before being updated. The contents of this table correspond to the generation number managing table 90 of FIG. 6A. Reference number 111 denotes the area of the update control information for the update. The control information (CI) is formed by the control information (CI) (i.e., the identifier (ID)) of the unit's own CPU 1, the generation number ("V/R=⅓") of the CPU 1, the generation number ("V/R=1/1") of another CPU 2, and the generation number ("V/R=⅛") of another CPU 3. This shows the case that the generation number (V/R=⅓) of the CPU 1 is updated.

Reference number 112 denotes the generation number managing table after an update operation. This table 112 is made from the generation number managing table 110 which is updated by the update control information 111. As shown by two arrows in FIG. 7, the first row of the generation number managing table (before update) 110 is replaced by the identifier of the CPU 1 of the update control information 111. As a result, the generation number managing table 112 which is updated can be obtained.

Figure 8:
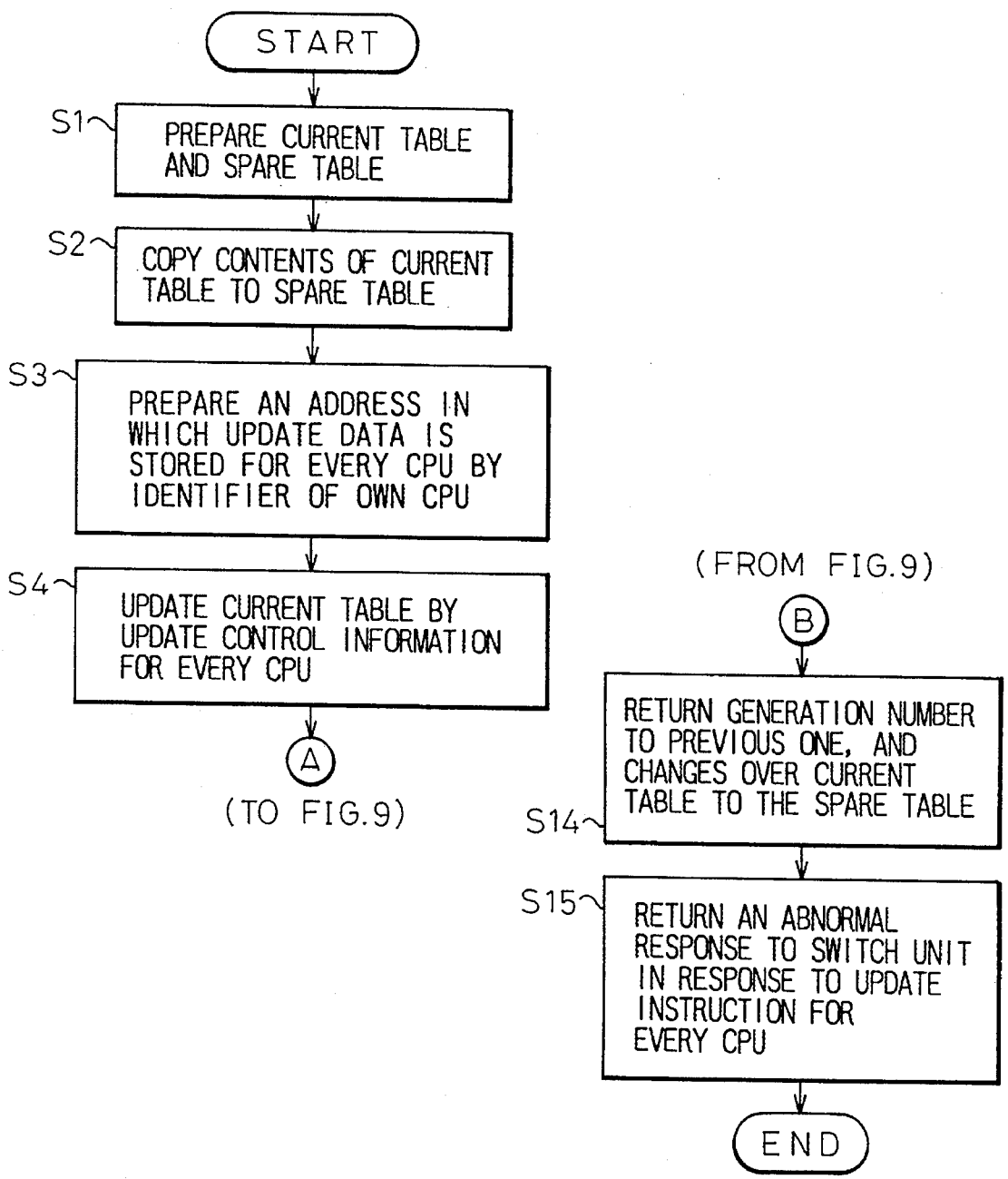

FIGS. 8 and 9 are flowcharts of the operation of the present invention. The update data are input from the input unit 62 to the generation number controlling unit 19, and held in the update processing unit 24 as shown in FIG. 5. FIGS. 8 and 9 show steps after the above processes of FIG. 5. The steps of FIGS. 8 and 9 are explained in detail with reference to FIG. 5 below. The reference numerals (1) to (4) correspond to those of FIG. 7.

In step S1, the update processing unit 24 prepares the current table 22 and the spare table 23.

In step S2, the copy processing unit 65 of the update processing unit 24 copies the contents of the current table 22 to the spare table 23.

In step S3, the update processing unit 66 prepares an address in which the update data is stored for every CPU in accordance with the identifier of a unit's own CPU.

In step S4, the update processing unit 66 of the update processing unit 24 updates the current table 22 in accordance with the update control information for every CPU.

In step S5, the generation number acquiring unit 70 of the decision unit 25 acquires the generation number of the unit's own CPU which is updated (see, numeral (1) in FIG. 7). That is, for the CPU "1", "V/R=½" is updated to "V/R=⅓" as shown in FIG. 7.

In step S6, the generation number acquiring unit 70 acquires the generation number of another CPU which is not updated (see, number (2) in FIG. 7). That is, "V/R=1/1" is not updated as shown by (2) in FIG. 7.

In step S7, the generation number comparing unit 71 of the decision unit 25 compares the generation number (1) of the CPU 1 (provided in the updated CPU) with the generation number (2) of the unit's own CPU 2 (provided in the CPU which is not updated).

When the generation number (1) (V/R=1/3) is equal to or larger than the generation number (2) (V/R=1/1), the decision unit 25 determines that these generation numbers are compatible ($\geq$), and the control proceeds to the step S8.

When the generation number (1) (V/R=1/3) is smaller than the generation number (2) (V/R=1/1), the decision unit 25 determines that these generation numbers are not compatible (<), and the control proceeds to the step S14.

In step S8, the decision unit 25 determines whether or not the generation numbers for all CPUs are compared. When comparisons are not completed (NO), the processes after the step S6 are repeated. When the comparisons for all of the CPUs are completed (YES), the control proceeds to the step S9.

In step S9, the generation number acquiring unit 70 acquires the generation number of another CPU in the updated CPU (see, number (3) in FIG. 7).

In step S10, the generation number acquiring unit 70 acquires the generation number of the unit's own CPU in the CPU which is not updated (see, number (4) in FIG. 7).

In step S11, the generation number comparing unit 71 compares the generation number (3) of another CPU (at the updated CPU) with the generation number (4) of the unit's own CPU (at the CPU which is not updated). When the generation number (3) of another CPU (V/R=1/8) is equal to or smaller than the generation number (4) (V/R=1/8) of the unit's own CPU (in the CPU which is not updated), the control proceeds to the step S12. When the generation number (3) of another CPU (V/R=1/8) is larger than the generation number (4) (V/R=1/8) of the unit's own CPU (in the CPU which is not updated), the control proceeds to the step S14.

In step S12, the decision unit 25 determines whether or not the generation numbers for all CPUs are compared. When comparisons are not completed (NO), the processes after the step S9 are repeated. When comparisons for all of the CPUs are completed (YES), the control proceeds to the step S13.

In step S13, the switch unit 26 receives the result of comparison. When the result is compatible, the switch unit 26 selects the current table 22, and returns a "normal response" to the update processing unit 24 in response to an "update instruction".

In step S14, the comparison result acquiring unit 81 of the switch unit 26 inputs the result of comparison. When result is not compatible, the switch unit 82 returns the generation number to the previous one, and changes over the current table 22 to the spare table 23. Accordingly, the spare table becomes "current" and the current table becomes "spare" after the above processes.

In step S15, the comparison unit 71 returns an "abnormal response" to the switch unit 26 in response to the update instruction for every CPU.

Further, the output unit 85 outputs the contents of the generation number managing table which is selected.

As explained above, according to the present invention, when either processors or program files in the multiprocessor system are changed to another one, or generation numbers, for example, version numbers, are revised, it is possible to easily and automatically manage these numbers so that a user can quickly check compatibility of generation numbers among the processors or program files before use of the multiprocessor system.

I claim:

1. A generation number managing apparatus for adjusting generation numbers among processors or program files in a multiprocessor system, said apparatus comprising:

generation number controlling means (19, 21), for receiving update data regarding the generation numbers of the processors or program files; and generation number managing means (20, 20', 20") operatively connected to the generation number controlling means for holding the generation numbers of the processors or program files, determining compatibility of the generation numbers by comparing them among processors or program files, and updating the generation numbers when they are compatible thereamong, wherein said generation number managing means include: a first table (22) for holding present generation numbers (below, current table); a second table (23) for holding generation numbers from one generation earlier (below, spare table); an update processing unit (24) for updating the generation numbers which are held in the current table based on the update data; a generation number compatibility decision unit (25) for determining compatibility of the generation numbers which are held in the current and spare tables; and a switch unit (26) for changing over the current table to the spare table when the generation numbers are not compatible.

2. A generation number managing apparatus as in claim 1, wherein said update processing unit (24) comprises a copy processing unit (65) for copying contents of the current table to the spare table, and a processing unit (66) for updating the contents of the current table.

3. A generation number managing apparatus as in claim 1, wherein said generation number compatibility decision unit (25) includes a generation number acquiring unit (70) for acquiring the generation numbers from the current table, and a generation number comparing unit (71) for comparing the generation numbers which are acquired from the current table among processors or program files.

4. A generation number managing apparatus as in claim 1, wherein said switch unit (26) comprises a result acquiring unit (81) for acquiring the result of comparison in the generation number comparing unit, and a switch processing unit (82) for changing the current table to the spare table based on the result of comparison.

5. A generation number managing apparatus as in claim 1, wherein said generation number includes a version number and a revision number which indicates a class in the same version.

6. A generation number managing apparatus as in claim 1, further comprising an update data input unit (62) for sending the update data to the generation number control means.

7. A generation number managing apparatus as in claim 1, further comprising an output unit (85) for outputting a generation number managing information.

* * * * *